(12) United States Patent
Ohashi et al.

(10) Patent No.: US 12,207,088 B2
(45) Date of Patent: *Jan. 21, 2025

(54) CONTROL DEVICE AND CONTROL METHOD

(71) Applicant: KABUSHIKI KAISHA TOKAI RIKA DENKI SEISAKUSHO, Aichi (JP)

(72) Inventors: Yosuke Ohashi, Aichi (JP); Masateru Furuta, Aichi (JP); Yuki Kono, Aichi (JP); Shigenori Nitta, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,864

(22) Filed: Mar. 8, 2024

(65) Prior Publication Data

US 2024/0214806 A1    Jun. 27, 2024

Related U.S. Application Data

(63) Continuation of application No. 17/240,297, filed on Apr. 26, 2021, now Pat. No. 11,956,630.

(30) Foreign Application Priority Data

Jun. 5, 2020   (JP) .................................. 2020-098254

(51) Int. Cl.
*H04W 12/06* (2021.01)
*G07C 9/00* (2020.01)
(Continued)

(52) U.S. Cl.
CPC ...... *H04W 12/068* (2021.01); *G07C 9/00309* (2013.01); *G07C 9/20* (2020.01);
(Continued)

(58) Field of Classification Search
CPC ...... H04W 12/068; H04W 12/03; G07C 9/20; G07C 9/00309; G07C 2009/00412; G07C 2009/00769
See application file for complete search history.

(56) References Cited

U.S. PATENT DOCUMENTS

| 2015/0038073 A1 | 2/2015 | Vang et al. |
| 2017/0076524 A1 | 3/2017 | Yoshihara |

(Continued)

FOREIGN PATENT DOCUMENTS

| JP | 2018-71190 | 5/2018 |
| JP | 2019-31871 | 2/2019 |

*Primary Examiner* — Stephen T Gundry
(74) *Attorney, Agent, or Firm* — GREENBLUM & BERNSTEIN, P.L.C.

(57) ABSTRACT

A control device comprising, a control section configured to control an authentication process of performing a process related to device authentication together with at least one communication device on a basis of information included in a signal received through wireless communication with the communication device, wherein the control section performs control in such a manner that a signal including authentication information that is information to be used for the authentication process is transmitted to the communication device through the wireless communication, the authentication information varying depending on signal types, which are types of roles of signals to be transmitted to the communication device in the authentication process.

13 Claims, 6 Drawing Sheets

(51) Int. Cl.
*G07C 9/20* (2020.01)
*H04W 12/03* (2021.01)

(52) U.S. Cl.
CPC .. *H04W 12/03* (2021.01); *G07C 2009/00412* (2013.01); *G07C 2009/00769* (2013.01)

(56) References Cited

U.S. PATENT DOCUMENTS

| | | | |
|---|---|---|---|
| 2019/0051072 A1 | 2/2019 | Okada | |
| 2019/0147678 A1* | 5/2019 | Saiki | B60R 25/24 340/5.64 |
| 2019/0156606 A1 | 5/2019 | Okada | |
| 2019/0256047 A1 | 8/2019 | Iwashita et al. | |
| 2019/0306704 A1* | 10/2019 | Arashin | H04W 12/06 |
| 2019/0322242 A1* | 10/2019 | Koike | G07C 9/00309 |
| 2019/0381972 A1* | 12/2019 | Takigawa | G07C 9/00309 |
| 2020/0001822 A1* | 1/2020 | Han | H04W 12/64 |
| 2020/0017022 A1 | 1/2020 | Pognon et al. | |
| 2020/0084625 A1 | 3/2020 | Kosugui et al. | |
| 2020/0101940 A1* | 4/2020 | Ueki | H04W 12/64 |
| 2020/0107194 A1 | 4/2020 | Ueki | |
| 2020/0127986 A1* | 4/2020 | Fujiwara | B60R 25/2018 |
| 2020/0128011 A1* | 4/2020 | Iimura | B60R 25/2018 |
| 2020/0128012 A1 | 4/2020 | Iimura et al. | |
| 2020/0223394 A1* | 7/2020 | Tamaru | B60R 25/40 |
| 2020/0258332 A1* | 8/2020 | Kato | G07C 9/00309 |
| 2020/0269809 A1* | 8/2020 | Sanji | B60R 25/31 |
| 2020/0329031 A1 | 10/2020 | Hashimoto et al. | |
| 2020/0363524 A1 | 11/2020 | Yoon et al. | |
| 2021/0016743 A1 | 1/2021 | Kusumoto et al. | |
| 2021/0181294 A1 | 6/2021 | Kusumoto et al. | |
| 2021/0291788 A1* | 9/2021 | Nawa | H04W 12/06 |
| 2021/0297962 A1* | 9/2021 | Furuta | H04W 56/001 |
| 2021/0304533 A1* | 9/2021 | Ohashi | H04W 12/63 |
| 2021/0365541 A1* | 11/2021 | Ohashi | B60R 25/24 |
| 2021/0367937 A1* | 11/2021 | Ohashi | H04W 12/61 |
| 2021/0368472 A1* | 11/2021 | Ohashi | G01S 13/765 |
| 2021/0370870 A1* | 12/2021 | Furuta | E05B 49/00 |
| 2021/0370881 A1* | 12/2021 | Kono | B60R 25/40 |
| 2021/0373119 A1* | 12/2021 | Ohashi | H04W 4/40 |
| 2021/0385650 A1* | 12/2021 | Ohashi | H04W 12/03 |
| 2022/0109561 A1 | 4/2022 | Yang et al. | |
| 2022/0167162 A1* | 5/2022 | Ohashi | H04W 12/06 |
| 2022/0191022 A1 | 6/2022 | Ohashi et al. | |
| 2022/0210641 A1 | 6/2022 | Ohashi | |
| 2022/0214701 A1 | 7/2022 | Park | |
| 2022/0276372 A1 | 9/2022 | Furuta et al. | |
| 2023/0016580 A1 | 1/2023 | Saiki et al. | |
| 2023/0039407 A1 | 2/2023 | Furuta et al. | |
| 2023/0039434 A1 | 2/2023 | Ohashi et al. | |
| 2023/0060554 A1 | 3/2023 | Kono et al. | |
| 2023/0087699 A1 | 3/2023 | Furuta et al. | |
| 2023/0124612 A1 | 4/2023 | Furuta et al. | |
| 2023/0133362 A1 | 5/2023 | Furuta et al. | |
| 2023/0138363 A1 | 5/2023 | Ohashi et al. | |

\* cited by examiner

CONTROL DEVICE AND CONTROL METHOD

CROSS REFERENCE TO RELATED APPLICATION

This application is a Continuation application of U.S. application Ser. No. 17/240,297, filed Apr. 26, 2021, which claims priority to Japanese Patent Application No. 2020-098254, filed on Jun. 5, 2020, the entire contents of which are hereby incorporated by reference.

BACKGROUND

The present invention relates to a control device and a control method.

In recent years, technologies of authenticating a device in accordance with a result of transmitting/receiving signals between devices have been developed. For example, JP 2019-31871A discloses a technology of authenticating a portable device by transmitting/receiving signals between a vehicle-mounted device and the portable device. The portable device is a remote control for locking or unlocking a vehicle. Such a portable device is also referred to as a smart key. In addition the portable device is carried by a driver. In addition to the authentication performed by a first communication unit, JP 2019-31871A also discloses a smart key system that uses a second communication unit to cause the vehicle-mounted device to measure a distance to the portable device and determines whether or not to permit a vehicle operation.

SUMMARY

However, signals are mixed up during transmission/reception of signals between devices, this causes a problem of failed communication.

Accordingly, the present invention is made in view of the aforementioned problem, and an object of the present invention is to provide a novel and improved control device and control method that make it possible to prevent signals from being mixed up during transmission/reception of the signals to be used for an authentication process between devices.

According to an aspect of the present invention, there is provided a control device comprising, a control section configured to control an authentication process of performing a process related to device authentication together with at least one communication device on a basis of information included in a signal received through wireless communication with the communication device, wherein the control section performs control in such a manner that a signal including authentication information that is information to be used for the authentication process is transmitted to the communication device through the wireless communication, the authentication information varying depending on signal types, which are types of roles of signals to be transmitted to the communication device in the authentication process.

According to another aspect of the present invention, there is provided a control method comprising, by a processor, controlling an authentication process of performing a process related to device authentication together with at least one communication device on a basis of information included in a signal received through wireless communication with the communication device, wherein the control is performed in such a manner that a signal including authentication information that is information to be used for the authentication process is transmitted to the communication device through the wireless communication, the authentication information varying depending on signal types, which are types of roles of signals to be transmitted to the communication device in the authentication process.

As described above, according to the present invention, it is possible to reduce a probability of mixing up signals during transmission/reception of the signals to be used for the authentication process between devices.

DETAILED DESCRIPTION OF THE EMBODIMENT(S)

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Configuration Example

Figure 1:
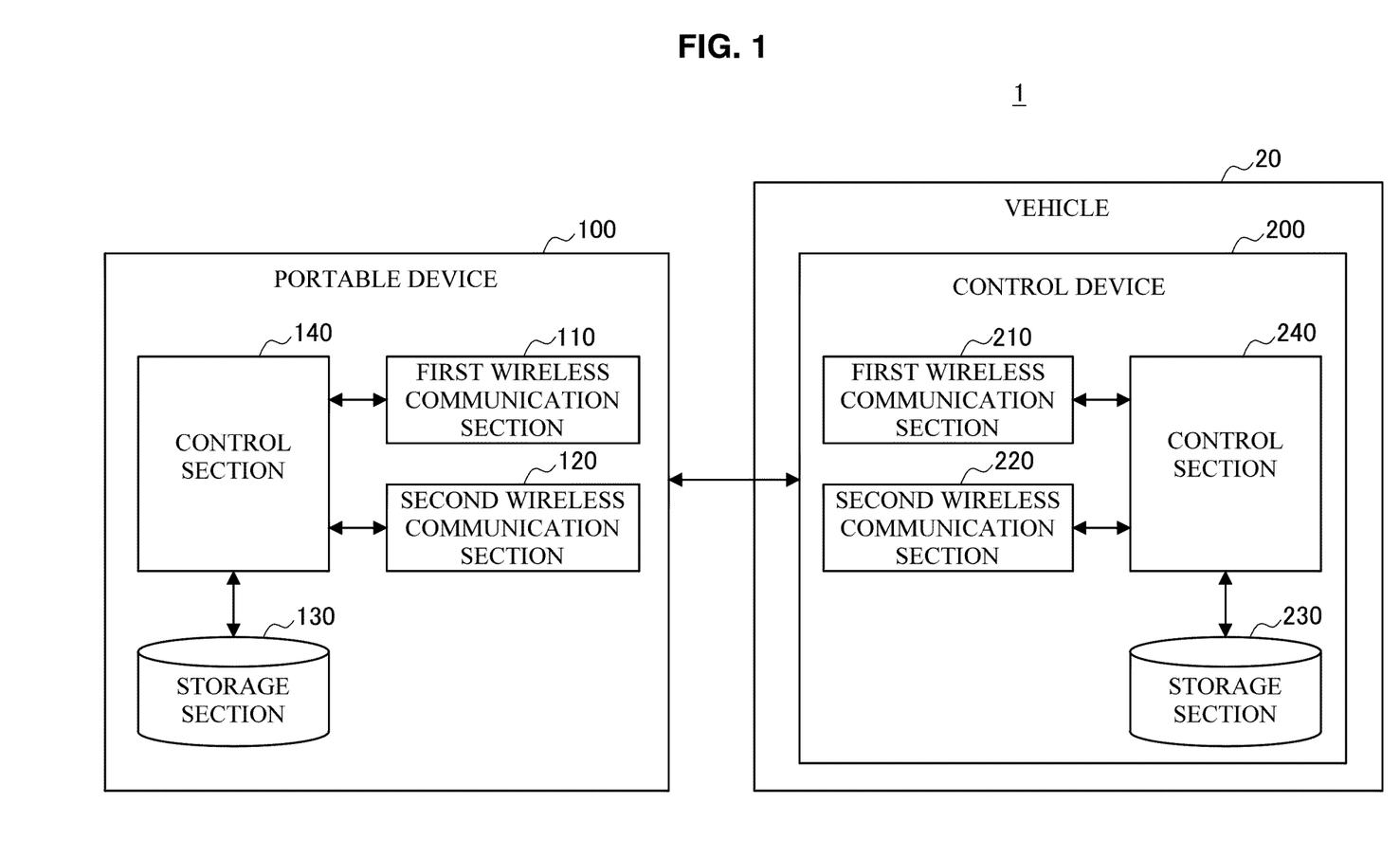
FIG. 1 is a diagram illustrating an example of a configuration of a system according to an embodiment of the present invention.

FIG. 1 is a diagram illustrating an example of a configuration of a system 1 according to an embodiment of the present invention. As illustrated in FIG. 1, the system 1 according to the present embodiment includes a portable device 100 and a control device 200. For example, the control device 200 according to the present embodiment is installed in a vehicle 20. The vehicle 20 is an example of a mobile object, which is an example of a target to be used by a user.

A communication device and a control device are involved in the present invention. The communication device is an authenticatee. The control device includes a control section configured to perform an authentication process of authenticating another communication device by using information obtained through communication with the communication device. In the example illustrated in FIG. 1, the portable device 100 is an example of the communication device, and the control device 200 is an example of the control device. For example, when a user such as a driver of the vehicle 20 carrying the portable device 100 approaches the vehicle, the system 1 performs wireless communication for authentication between the portable device 100 and the control device 200 installed in the vehicle 20. Next, when the authentication succeeds, the vehicle 20 becomes available for the user by opening a door lock of the vehicle 20 and starting an engine of the vehicle 20. The system 1 is also referred to as a smart entry system. Next, respective structural elements will be described sequentially.

(1-1) Portable Device 100

The portable device 100 is configured as an arbitrary device. Examples of the arbitrary device include devices such as an electronic key, a smartphone, and a wearable terminal, which are used while being carried by the user such as the driver. As illustrated in FIG. 1, the portable device 100 includes a first wireless communication section 110, a second wireless communication section 120, a storage section 130, and a control section 140.

The first wireless communication section 110 has a function of performing communication with the control device 200 in conformity with a first wireless communication standard. The second wireless communication section 120 has a function of performing communication with control device 200 in conformity with a second wireless communication standard that is different from the first wireless communication standard. In particular, the second wireless communication standard is more appropriate for ranging than the first wireless communication standard, and the second wireless communication section 120 mainly handle communication related to the ranging.

Here, the first wireless communication standard may satisfy at least any of a requirement that the first wireless communication standard achieves higher gain than the second wireless communication standard and a requirement that the first wireless communication standard achieves lower electric power consumption on a reception side than the second wireless communication standard. As a specific example that satisfies such a requirement, the second wireless communication standard may use a carrier wave of higher frequency than frequency of a carrier wave used under the first wireless communication standard. As the frequency of the carrier wave gets higher, attenuation based on distance gets larger and the gain gets reduced. As the frequency of the carrier wave gets lower, attenuation based on distance gets smaller and the gain gets increased. Accordingly, the above-described requirement related to the gain is satisfied. In addition, when the carrier wave has a high frequency, effects on a human body such as absorption into the human body get larger, and the gain gets reduced.

Note that, considering that sampling frequency is set depending on a maximum value of frequency of the carrier wave, it is sufficient to satisfy at least a requirement that maximum frequency of the carrier wave based on the second wireless communication standard is higher than maximum frequency of the carrier wave based on the first wireless communication standard.

For example, in accordance with the first wireless communication standard, a radio frequency (RF) band signal and a low frequency (LF) band signal may be used. In a typical smart entry system, the RF band signal is used for transmission from the portable device 100 to the control device 200 of the vehicle 20, and the LF band signal is used for transmission from the control device 200 of the vehicle 20 to the portable device 100. Next, the following description will be given on an assumption that the first wireless communication section 110 is configured as a communication interface that makes it possible to perform communication by using the RE band signal and the LF band signal. In other words, in the following description, it is assumed that the RF band signal is used for transmission to the control device 200 of the vehicle 20 and the LF band signal is used for reception from the control device 200 of the vehicle 20.

For example, in accordance with the second wireless communication standard, an ultra-wideband (UWB) signal may be used. An UWB impulse signal has a property that makes it possible to perform positioning and ranging with high accuracy. In other words, it is possible to measure air propagation time of a radio wave with high accuracy by using the radio wave of ultra-short pulse width of nanoseconds or less, and it is possible to perform positioning and ranging on the basis of the propagation time. Next, it is assumed that the second wireless communication section 120 is configured as a communication interface that makes it possible to perform communication by using the UWB signal.

Note that, the UWB signal may be transmitted/received as a ranging signal and a data signal. The ranging signal is a signal transmitted and received in the ranging process (to be described later). For example, the ranging signal may be configured in a frame format that does not include a payload part for storing data or in a frame format that includes the payload part. The data signal is a signal that carries data. The data signal is preferably configured in the frame format that includes the payload part for storing the data. Hereinafter, it is assumed that the ranging signal is configured in the frame format that does not include the payload part for storing data. In addition, it is assumed that the data signal is configured in the frame format that includes the payload part for storing the data.

The storage section 130 has a function of storing various kinds of information for operating the portable device 100. For example, the storage section 130 stores a program for operating the portable device 100, and an identifier (an example of identification information), password, and authentication algorithm for authentication, etc. For example, the storage section 130 includes a storage medium such as flash memory and a processing device that performs recording/playback on/of the storage medium.

The control section 140 has a function of controlling overall operation performed by the portable device 100. For example, the control section 140 controls the first wireless communication section 110 and the second wireless communication section 120 to communicate with the communication unit 200 of the vehicle. In addition, the control section 140 reads information from the storage section 130 and writes information into the storage section 130. The control section 140 also functions as an authentication control section that controls an authentication process between the vehicle and the control device 200. For example, the control section 140 includes an electronic circuit such as a microprocessor and a central processing unit (CPU).

(1-2) Control Device 200

The control device 200 is prepared in association with the vehicle. Here, the control device 200 is assumed to be installed in the vehicle 20. For examples of the installation position, the control device 200 may be installed in a vehicle interior of the vehicle 20, may be built in the vehicle 20 as a control module or a communication module, or may be installed in other ways. Alternatively, the control device 200 may be prepared as a separate object from the target to be used by the user in such a manner that the control device 200 is installed in a parking space for the vehicle 20 or in other manners. In this case, the control device 200 may wirelessly transmit a control signal to the vehicle 20 on the basis of a result of communication with the portable device 100 and may remotely control the vehicle 20. As illustrated in FIG. 1, the control device 200 includes a first wireless communication section 210, a second wireless communication section 220, a storage section 230, and a control section 240.

The first wireless communication section 210 has a function of performing communication with portable device 100 in conformity with the first wireless communication standard. Next, it is assumed that the first wireless communication section 210 is configured as a communication interface that makes it possible to perform communication by using the RF band signal and the LF band signal.

In addition, the second wireless communication section 220 has a function of performing communication with portable device 100 in conformity with the second wireless communication standard that is different from the first wireless communication standard. Next, it is assumed that the second wireless communication section 220 is configured as a communication interface that makes it possible to perform communication by using the UWB signal. The vehicle 20 may be provided with a plurality of the second wireless communication sections 220.

The storage section 230 has a function of storing various kinds of information for operating the control device 200. For example, the storage section 230 stores a program for operating the control device 200, and an identifier (an example of identification information), password, and authentication algorithm for authentication, etc. For example, the storage section 230 includes a storage medium such as flash memory and a processing device that performs recording/playback on/of the storage medium.

The control section 240 has a function of controlling overall operation performed by the control device 200 and in-vehicle equipment installed in the vehicle. For example, the control section 240 controls the first wireless communication section 210 and the second wireless communication section 220 to communicate with the portable device 100. In addition, the control section 240 reads information from the storage section 230 and writes information into the storage section 230. The control section 240 also functions as an authentication control section that controls the authentication process between the portable device 100 and the control device 200 of the vehicle 20. In addition, the control section 240 also functions as a door lock control section that controls the door lock of the vehicle, and opens and closes the door lock. The control section 240 also functions as an engine control section that controls the engine of the vehicle, and starts/stops the engine. Note that, a motor or the like may be installed as a power source of the vehicle in addition to or instead of the engine. For example, the control section 240 may be configured as an electronic control unit (ECU).

Note that, the control device 200 illustrated in IG. 1 is an example of the control device according to the present invention. The configuration of the control device according to the present invention is not limited to the example illustrated in FIG. 1. For example, the control device may include a communication module including the first wireless communication section 210, a communication module including the second wireless communication section 220, and a control module including the control section 240. In addition, the configuration of the control device according to the present invention may be implemented as the communication module including the first wireless communication section 210, the communication module including the second wireless communication section 220, and the control module including the control section 240. The modules are connected via a wired or wireless communication network. For example, the communication network may be an in-vehicle communication network that meets any standard such as a Controller Area Network (CAN), a Local Interconnect Network (LIN), or a local area network (LAN).

In addition, the configurations of the respective devices illustrated in FIG. 1 are mere examples. For example, according to the configuration illustrated in FIG. 1, each of the portable device 100 and the control device 200 includes the first wireless communication section and the second wireless communication section. However, the present invention is not limited thereto. For example, each of the portable device 100 and the control device 200 may include a wireless communication section that performs communication in conformity with a single wireless communication standard. The vehicle 20 may be provided with a plurality of the wireless communication sections. The wireless communication section transmits and receives signals to be used for the authentication process. Note that, any frequency band can be used when the wireless communication section transmits a signal to be used for the authentication process. For example, the signals used for the authentication process may be transmitted as the UWB signal, the LF band signal, the RF band signal, or the Bluetooth Low Energy (BLE) (registered trademark) signal.

2. Authentication Process

The smart entry system sometimes authenticates the portable device 100 on the basis of a distance between the portable device 100 and the control device 200 installed in the vehicle. The authentication process according to the present embodiment includes a process of measuring the distance between the portable device 100 and the control device 200 (also referred to as a "ranging process" in this specification) and a process of performing authentication based on a result of measuring the distance. The authentication based on the distance makes it possible to reduce distance fabrication and authenticatee spoofing such as a relay attack, which is a technique of relaying a transmission signal of the control device (authenticatee) of the vehicle and indirectly establishing communication between the portable device (authenticatee) and the control device by using a relay and improperly making the authentication successful. This makes it possible to effectively enhance accuracy of the authentication.

Figure 2:
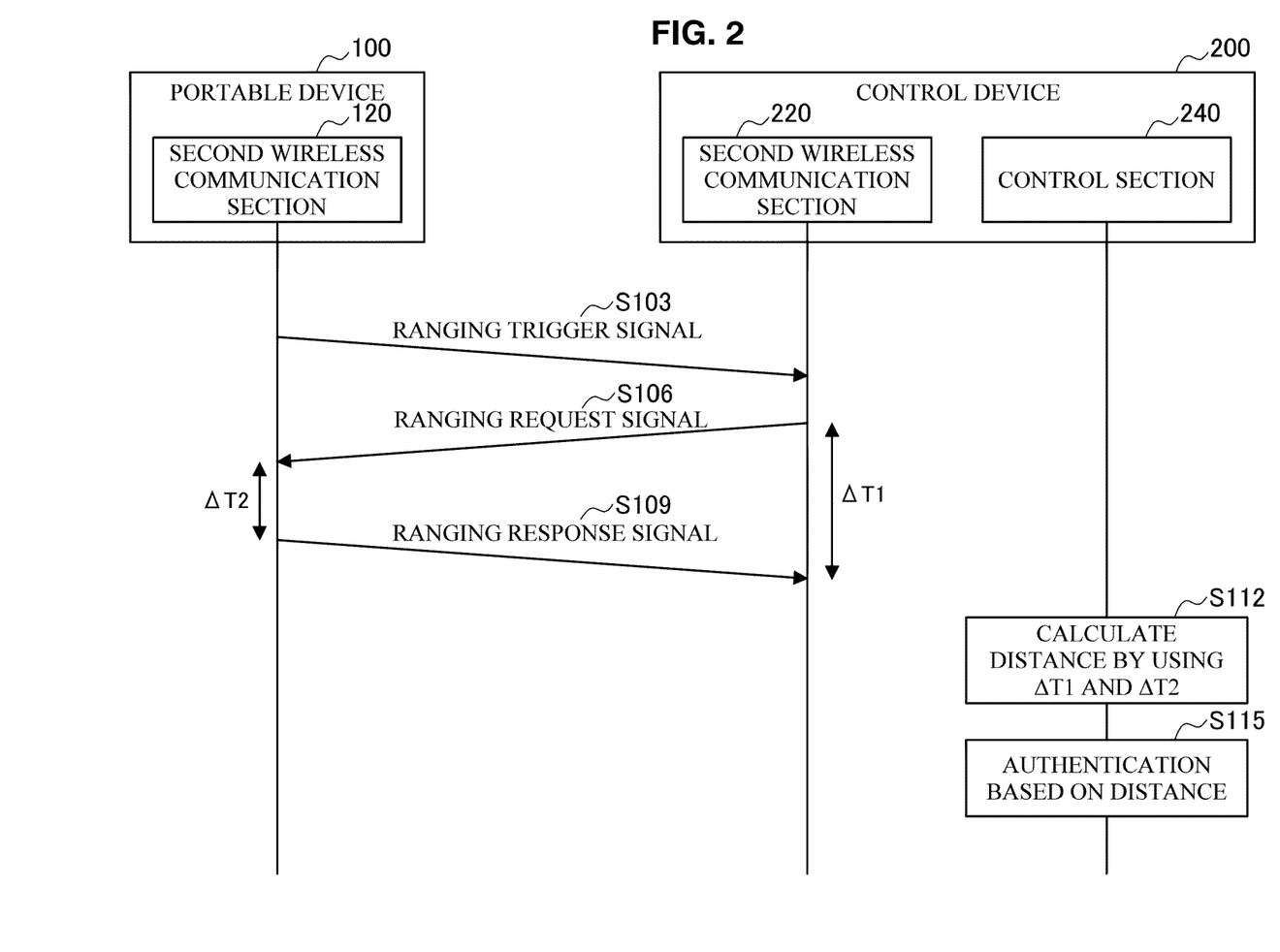
FIG. 2 is a sequence diagram illustrating an example of a basic flow of an authentication process according to the embodiment.

FIG. 2 is a sequence diagram illustrating an example of a basic flow of the authentication process according to the present embodiment. As illustrated in FIG. 2, the portable device 100 first transmits a ranging trigger signal (Step S103). According to the present embodiment, for example, the portable device 100 transmits a signal (ranging trigger signal) for instructing to transmit a first ranging signal before the control device 200 transmits the first ranging signal. Note that, the ranging trigger signal is also an example of the ranging signal. For example the UWB signal is used for the ranging trigger signal. Specifically, the portable device 100 may transmit the ranging trigger signal via the second wireless communication section 120.

Next, when the ranging trigger signal is received, the control device 200 transmits a ranging request signal for requesting a response for the ranging process, as the first ranging signal (Step S106). For example the UWB signal is used for the ranging request signal. Specifically, the control device 200 may transmit the ranging request signal via the second wireless communication section 220.

Next, when the ranging request signal (first ranging signal) is received from the control device 200 and a time period ΔT2 elapses after the reception of the ranging request signal (first ranging signal) from the control device 200, the portable device 100 transmits a ranging response signal in response to the ranging request, as the second ranging signal (Step S109). For example the UWB signal is used for the ranging response signal. Specifically, the portable device 100 may transmit the ranging response signal via the second wireless communication section 120. The time period $\Delta T2$ is a pre-designated time period. The time period $\Delta T2$ is set to be longer than a time period, which is assumed to be required for a process from time when the portable device 100 receives the first ranging signal to time when the portable device 100 transmits the second ranging signal. This makes it possible to certainly finish preparation for transmission of the second ranging signal before the time period $\Delta T2$ elapses after reception of the first ranging signal. The time period $\Delta T2$ may also be known to the control device 200.

Next, when the ranging response signal (second ranging signal) is received, the control section 240 of the control device 200 calculates a distance between the portable device 100 and the control device 200 (Step S112). Specifically, the control device 200 measures the time period $\Delta T1$ from transmission time of the first ranging signal to reception time of the second ranging signal, and calculates the distance on the basis of the measured time period $\Delta T1$ and the known time period $\Delta T2$. The control device 200 may calculate time taken to transmit or receive a one-way signal by subtracting $\Delta T2$ from $\Delta T1$ and dividing the subtracted value by 2, and then calculate the distance between the portable device 100 and the communication device 200 by multiplying the calculated time by speed of the signal. Note that, the time period $\Delta T2$ does not have to be known to the control device 200. For example, the portable device 100 may measure the time period $\Delta T2$ and report the measured time period $\Delta T2$ to the control device 200. Such a report may be made by transmitting a data signal including information obtained by encrypting information indicating the time period $\Delta T2$. The data signal is another example of the signal for the ranging process. The data signal is a signal that stores and carries data. The data signal is configured in the frame format that includes the payload part for storing the data. In addition, the data signal may be transmitted and received as the UWB signal.

Note that, the distance may be calculated in Step S112 by the control section of a communication unit in the case where the second wireless communication section 220 is configured as the communication unit. In this case, the communication unit transmits a calculation result to the control section 140 via an in-vehicle communication network. In addition, the vehicle 20 may be provided with a plurality of the second wireless communication sections 220. The control section 240 may calculate the distance between the portable device 100 and the control device 200 on the basis of data transmitted and received between the portable device 100 and the plurality of second wireless communication sections 220.

Next, the control section 240 of the control device 200 authenticates the portable device 100 on the basis of whether or not the calculated distance satisfies a predetermined condition (Step S115). For example, the control section 240 determines that the authentication succeeds if the calculated distance is a predetermined value or less. If not, the control section 240 determines that the authentication ends in failure. In addition, if the calculated distance falls within a predetermined range, the control section 240 may determine that authentication for performing corresponding predetermined control succeeds. For example, in the case where a distance between the user carrying the portable device 100 and the vehicle 20 provided with the control device 200 falls within the predetermined range, the control section 240 determines that authentication for controlling a light installed in the vehicle 20 and causing the light to turn on succeeds, and the control unit 210 performs control in such a manner that the light is turned on. Next, in the case where the user approaches the vehicle 20 more, the control section 240 may determine that authentication for controlling the door lock and opening the door lock of the vehicle 20 succeeds, and may perform control in such a manner that the door lock is opened.

Summary of Issues

Here, the above-described ranging trigger signal, ranging request signal, and ranging response signal include predetermined information for authentication. The "predetermined information for authentication" is referred to as "authentication information" in this specification. The device that has received the signal determines whether or not the received signal is a signal transmitted from a partner paired with the own device, on the basis of the authentication information included in the signal. The authentication information may be the ID of the device, or may be information obtained by encrypting some kind of designated information. For example, the information may be encrypted by using an encryption key that is shared in advance between a device serving as a transmitter of a signal and a device serving as a receiver of the signal. In the case of the encrypted information, the device serving as the receiver of the signal decrypts the encrypted information. In the case where the decryption succeeds, the device serving as the receiver of the signal can determine that the signal is transmitted from the partner paired with the own device. Here, for example, the key and logic used for the encryption may be common to the authenticatee and the authenticator, which handle the encrypted information, but different information input during the encryption process may be used by the authenticatee and the authenticator. In addition, it is also possible that at least one of the key and logic used for the encryption may be different between the authenticatee and the authenticator, but the information input during the encryption process may be common to or different between the authenticatee and the authenticator. In addition, in the case of changing the key or logic to be used for the encryption or information to be input, it may be changed on the basis of the rule of change, which are shared by the authenticatee and the authenticator in advance.

However, in the case where same authentication information is used for at least two or more signals among the ranging trigger signal, ranging request signal, and ranging response signal, there is a possibility that a device serving as a signal receiver may mix up the signals. In particular, in the case where the vehicle 20 is provided with the plurality of wireless communication sections, there is a possibility that one of the wireless communication sections may receive a signal transmitted from another wireless communication section to the portable device 100 and the vehicle 20 may misidentify the signal transmitted to the portable device 100 as a signal transmitted from the portable device 100. Next, details thereof will be described with reference to FIG. 3.

Figure 3:
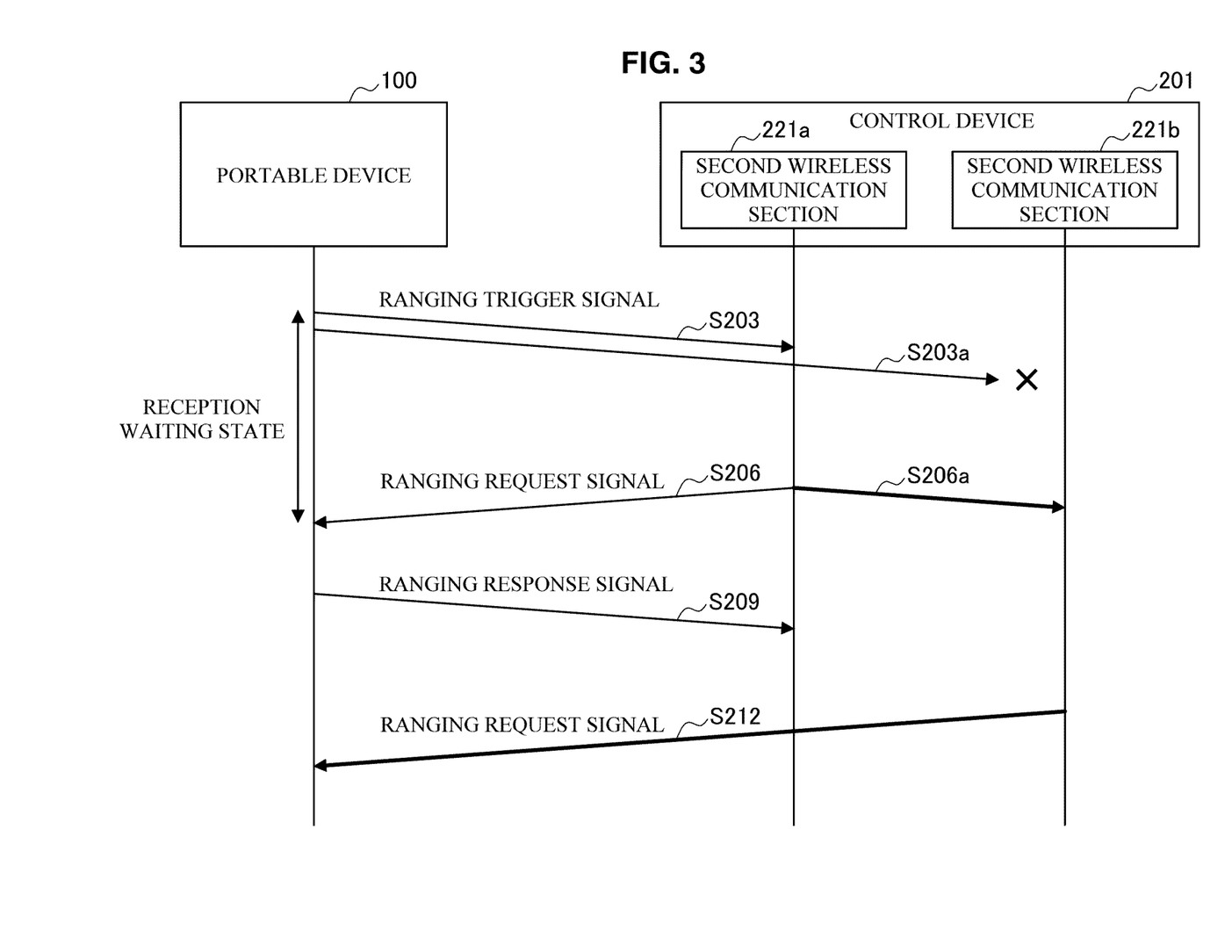
FIG. 3 is a diagram for describing signal mix-up.

FIG. 3 is a diagram for describing signal mix-up. FIG. 3 illustrates a comparative example in which a control device 201 mixes up signals. The control device 201 is a device including a plurality of second wireless communication sections 221a and 221b, and is installed in the vehicle 20.

As illustrated in FIG. 3, the portable device 100 first transmits a ranging trigger signal (Step S203). Next, the second wireless communication section 210 that has received the ranging trigger signal transmits a ranging request signal (Step S206). Next, the portable device 100 transmits a ranging response signal (Step S209) when a predetermined time period (ΔT2 described above) elapses after reception of the ranging request signal.

Here, in the case where the "ranging trigger signal" and the "ranging request signal" include same authentication information, the second wireless communication sections 221 may mix up the "ranging trigger signal" and the "ranging request signal". For example, in the case of the same authentication information, it is assumed that same encrypted information is used. The second wireless communication section 221b is controlled in such a manner that the second wireless communication section 221b enters a reception waiting state in advance. In the case where the second wireless communication section 221b fails to receive the ranging trigger signal transmitted from the portable device 100 (Step S203a), there is a possibility that the second wireless communication section 221b may receive the ranging request signal transmitted from the second wireless communication section 221a (Step S206a), and may identify the ranging request signal as the ranging trigger signal.

The reception waiting state means a state for performing a process of importing a received signal. The second wireless communication section 221b may be controlled in such a manner that the second wireless communication section 221b enters the reception waiting state for receiving the ranging trigger signal at an arbitrary timing, on the basis of communication performed between the portable device 100 and the control device 201 before the portable device 100 transmits the ranging trigger signal by using the UWB. The preceding communication may be performed by the first wireless communication section capable of performing communication using the RF band signal and the LF band signal. Next, even in the case where the second wireless communication section 221b is controlled in such a manner that the second wireless communication section 221b enters the reception waiting state for receiving the ranging trigger signal but a received UWB signal is actually a ranging request signal transmitted from the second wireless communication section 221a, the second wireless communication section 221b identifies the UWB signal as the ranging trigger signal if encrypted information included in the signal is successfully decrypted.

Next, the second wireless communication section 221b that has misidentified the received ranging request signal as the ranging trigger signal transmits the ranging request signal to the portable device 100 (Step S212). However, in the case of the misidentification, there is a high possibility that the transmission timing of the ranging request signal does not match a time period in which the portable device 100 is in the reception waiting state, and communication is not successfully established. To reduce electric power consumption, the portable device 100 is controlled in such a manner that the portable device 100 enters the reception waiting state for a predetermined period of time after the ranging trigger signal is transmitted in Step S203 as described above. Therefore, the portable device 100 does not receive or import the ranging request signal transmitted from the second wireless communication section 221b at a delayed timing, and does not transmit the ranging response signal thereafter.

As described above, when the second wireless communication section 221b transmits the ranging request signal at the delayed timing due to misidentification, it is impossible to perform communication for ranging, and this results in waste of electricity.

Therefore, according to an embodiment of the present invention, different pieces of authentication information are used for respective signals related to the inter-device authentication process. In other words, different pieces of authentication information are used depending of signal types, which are types of roles of signals used in the authentication process such as the ranging trigger signal and the ranging request signal. Specifically, different pieces of authentication information are used between the ranging trigger signal and the ranging request signal. This makes it possible to reduce the misidentification of the signals and reduce the waste of electricity.

Next, technical features of the embodiment of the present invention will be described.

4. Technical Features

Figure 4:
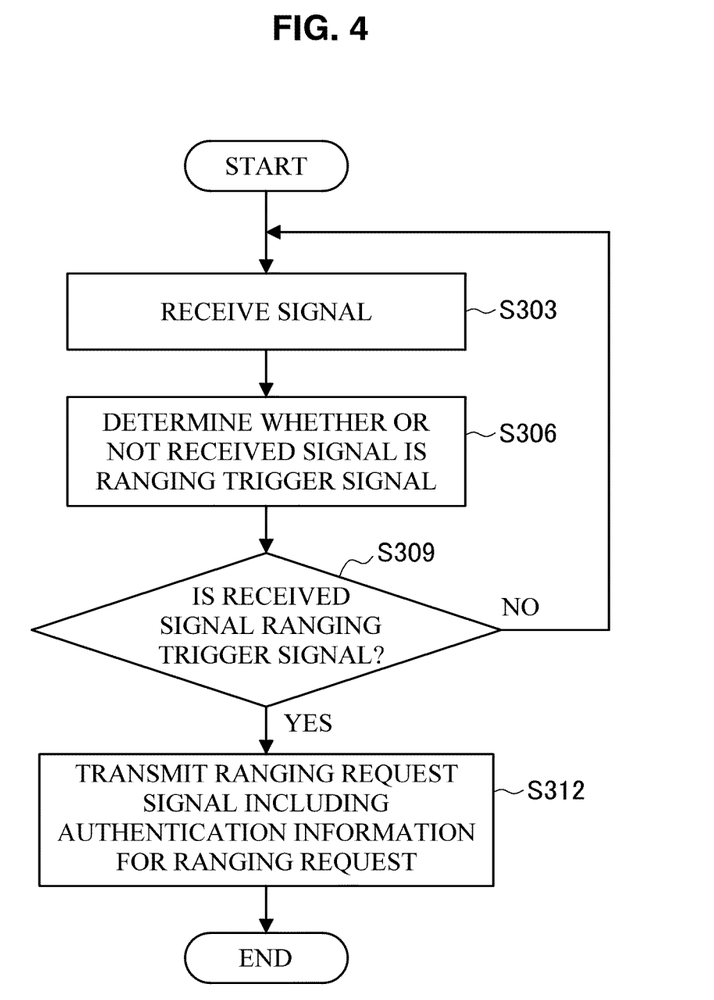
FIG. 4 is a flowchart illustrating an example of a flow of an authentication process based on a distance to a control device according to the embodiment.

FIG. 4 is a flowchart illustrating an example of a flow of an authentication process based on a distance to the control device 200 according to the present embodiment. In the present specification, the "authentication process based on a distance" includes a ranging process of measuring a distance between the portable device 100 and the control device 200, and an authentication process of performing authentication on the basis of the distance measured through the ranging process. The operation processes illustrated in FIG. 4 are processes performed by the control device 200 to control transmission and reception of signals to be used for the ranging process.

As illustrated in FIG. 4, the control section 240 of the control device 200 first receives a signal via the second wireless communication section 220 (Step S303). The vehicle 20 may be provided with a plurality of the second wireless communication sections 220. The plurality of second wireless communication section 220 receives respective signals. In addition, each of the second wireless communication sections 220 is controlled in such a manner that each of the second wireless communication sections 220 enters the reception waiting state in advance, and each of the second wireless communication sections 220 may receive a signal. The reception waiting state means a state for performing various kinds of processes to import a received signal. Examples of the various kinds of processes include a process in which an antenna of the second wireless communication section 220 receives a signal, a process in which the second wireless communication section 220 samples the received signal, a process in which the control section 240 performs a process based on a signal obtained through the sampling, and other processes. The control section 240 according to the present embodiment causes the second wireless communication section 220 to transition to the state of waiting for reception of the ranging trigger signal at an arbitrary timing, and waits for reception of the ranging trigger signal. Note that, the arbitrary timing is a timing at which communication is established between the portable device 100 and the control device 200 before the portable device 100 transmits the ranging trigger signal by using the UWB, for example. When the communication is established between the portable device 100 and the control device 200, the control section 240 performs control in such a manner that one or more second wireless communication section 220 enters the reception waiting state for receiving the ranging trigger signal. The preceding communication may be performed by the first wireless communication section capable of performing communication using the RF band signal and the LF band signal, for example.

Next, the control section 240 determines whether or not the received signal is the ranging trigger signal (Step S306). In the case of the plurality of second wireless communication sections 220, the control section 240 determines whether or not respective signals received by the second wireless communication sections 220 are the ranging trigger signal. The ranging trigger according to the present embodiment includes authentication information that varies depending on the signal types. Therefore, it is possible for the control section 240 to determine whether or not the received signal is the ranging trigger signal on the basis of the authentication information included in the received signal. For example, the authentication information is information encrypted by using a common key for the ranging trigger signal. By using the encrypted information, it is possible to further enhance security. The control section 240 may determine that the received signal is the ranging trigger signal in the case where encrypted information included in the received signal is decrypted by using the common key for the ranging trigger. Alternatively, the control section 240 may determine that the received signal is the ranging trigger signal in the case where the decrypted information is identical to the information that is shared in advance with the portable device 100.

Next, in the case where the received signal is identified as the ranging trigger signal (YES in Step S309), the control section 240 performs control in such a manner that a ranging request signal including the authentication information for ranging request is generated and the second wireless communication section 220 transmits the generated signal (Step S312). For example, the authentication information for ranging request is information encrypted by using a common key for the ranging request signal. Original information, which is an encryption target, may be information that is shared in advance with the portable device 100 or may be a random number. The common key used for the ranging request signal is different from the common key used for the ranging trigger signal. In case another second wireless communication section 220 receives the ranging request signal, it is possible to reduce a possibility of misidentification of the ranging request signal as the ranging trigger signal in Step S306, by transmitting the ranging request signal including the authentication information for ranging request signal.

As described above, when the ranging signal such as the ranging trigger signal or the ranging request signal according to the present embodiment includes authentication information that varies depending on the signal types, it is possible to reduce a probability of mixing up signals as described above with reference to FIG. 4, and it is possible to reduce the waste of electricity. The authentication information that varies depending on the signal types may be generated by encrypting designated information with one of common keys that are different among the respective signal types. Note that, in the present specification, the ranging signals include the ranging response signal. For example, the portable device 100 may include information encrypted with a common key for the ranging response signal, which is shared in advance with the control device 200, into the ranging response signal. The system 1 may use at least the authentication information included in the ranging trigger signal and the authentication information included in the ranging request signal and the ranging response signal.

These pieces of authentication information are different from each other. In addition, the portable device 100 and the control device 20 may 10) generate authentication information by using one of keys that are different depending on the signal types and the second wireless communication sections. For example, authentication information included in a ranging request signal transmitted from the second wireless communication section 220a and authentication information included in a ranging request signal transmitted from the second wireless communication section 220b are generated by using different keys. In addition, in a similar way, the portable device 100 use different keys to generate authentication information included in a ranging response information in response to the ranging request signal transmitted from the second wireless communication section 220a, and authentication information included in a ranging response information in response to the ranging request signal transmitted from the second wireless communication section 220b. As described above, even in the case of the signals of the same signal type, it is possible to further enhance security by using different pieces of authentication information depending on communication subjects or communication partners. In addition, in the above embodiment, information obtained by encrypting designated information is used as the authentication information. However, the embodiment of the present invention is not limited thereto. For example, it is possible to use identification information specific to the portable device 100 or identification information specific to the control device 200.

In addition, the operation process illustrated in FIG. 4 is an example of the embodiment of the present invention, and the present invention is not limited thereto. For example, in the case where the second wireless communication section 220 is configured as a communication unit, the process illustrated in Step S306 may be controlled by a control section (not illustrated) of the second wireless communication section 220.

In addition, the arbitrary timing of causing the second wireless communication section 220 to transition to the reception waiting state before Step S303 described above may be a timing at which the control device 200 receives a predetermined signal from the portable device 100 via the first wireless communication section 210, a period during which the control device 200 authenticates the portable device 100 on the basis of the predetermined signal that has been received, or a timing that comes after the authentication ends. In other words, it is also considered that a predetermined signal is transmitted and received between the portable device 100 and the control device 200 before Step S303 described above. In the case of transmitting/receiving any predetermined signal between the portable device 100 and the control device 200, the signal may be transmitted/received between the first wireless communication section 110 of the portable device 100 and the first wireless communication section 210 of the control device 200.

For example, the request response authentication is performed between the portable device 100 and the control device 200. In the request response authentication, an authentication request signal and an authentication response signal generated on the basis of the authentication request are transmitted and received. The request response authentication is an authentication method in which an authenticator generates an authentication request signal and transmits the generated authentication request signal to an authenticatee, the authenticatee generates an authentication response signal on the basis of the authentication request signal and transmits the generated authentication response signal to the authenticator, and the authenticator authenticates the authenticatee on the basis of the authentication response signal. Typically, the authentication request signal is a random number, which is changed with each authentication. Accordingly, the request response authentication is resistant to a replay attack. In addition, the authentication response signal is generated on the basis of the information regarding the authenticatee. For example, the information regarding the authenticatee is an ID, a password, and the like. The ID and the password themselves are not transmitted/received. This makes it possible to reduce a possibility of eavesdropping. More specifically, for example, in response to a first authentication signal transmitted as an authentication request from the control device 200, a second authentication signal is transmitted as an authentication response. The second authentication signal is a signal calculated by the portable device 100 on the basis of the first authentication signal and key information such as a prestored password. In the case where the second authentication signal transmitted as the authentication response is admitted as a signal indicating a proper value calculated from the key information and the first authentication signal serving as the authentication request, the control device 200 may determine that the portable device 100 is successfully authenticated.

In addition, it is also possible to transmit/receive a wake-up signal for instructing to activate the device, and a response to the wake-up signal between the portable device 100 and the control device 200. The wake-up signal can cause a receiver to wake up from a sleep mode. Examples of the response to the wake-up signal include an acknowledgment (ACK) signal that indicates activation, and a negative acknowledgement (NACK) signal that indicates non-activation.

Alternatively, before waiting for reception of the ranging trigger signal, a response to the wake-up signal may be communicated and the request response authentication may be performed between the portable device 100 and the control device 200. The control device 200 starts waiting for reception of the ranging trigger signal on the basis of such a response to the wake-up signal and the request response authentication.

The control device 200 starts waiting for reception on the basis of the response to the wake-up signal or the request response authentication. This makes it possible to shorten the reception waiting period. In addition, it is possible to further improve accuracy of authentication by adding one-stage authentication process based on another method before the authentication process based on a distance.

Note that, a signal transmitted from one device to another device with regard to the response to the wake-up signal and the request response authentication is also referred to as a first notification signal. In addition, a signal transmitted from a device that has received the first notification signal to a device that has transmitted the first notification signal is also referred to as a second notification signal. Each device determines that a partner device is successfully authenticated only in the case where a proper second authentication signal corresponding to the first authentication signal is transmitted in response to the first authentication signal. Any frequency band can be used for transmitting the first and second notification signals. For example, the notification signal may be transmitted by using a same frequency band as the ranging signal such as the ranging trigger signal or the ranging request signal, or by using a different frequency band from the ranging signal. In addition, the notification signal may be transmitted as the UWB signal, the LF band signal, the RF band signal, or the Bluetooth Low Energy (BLE) signal.

In addition, for example, the use of different pieces of authentication information depending on the signal types according to the present embodiment is applicable to various kinds of signals to be used for the request response authentication such as the first notification signal and the second notification signal.

5. Application Example

In the comparative example described above with reference to FIG. 3, the control device 201 includes the plurality of second wireless communication sections 221a and 221b. In this case, there is a possibility that one of the second communication sections 221 may receive the ranging request signal transmitted from another second wireless communication section 221, and the ranging request signal may be misidentified as the ranging trigger signal, as described above.

On the other hand, in the case where the control device include only one second wireless communication section but respective ranging signals include same authentication information, there is a possibility that a signal copied by an unauthorized tool such as a relay for performing the relay attack may be misidentified as a legitimate signal, and authenticatee spoofing may be performed. Next, details thereof will be described with reference to FIG. 5.

Figure 5:
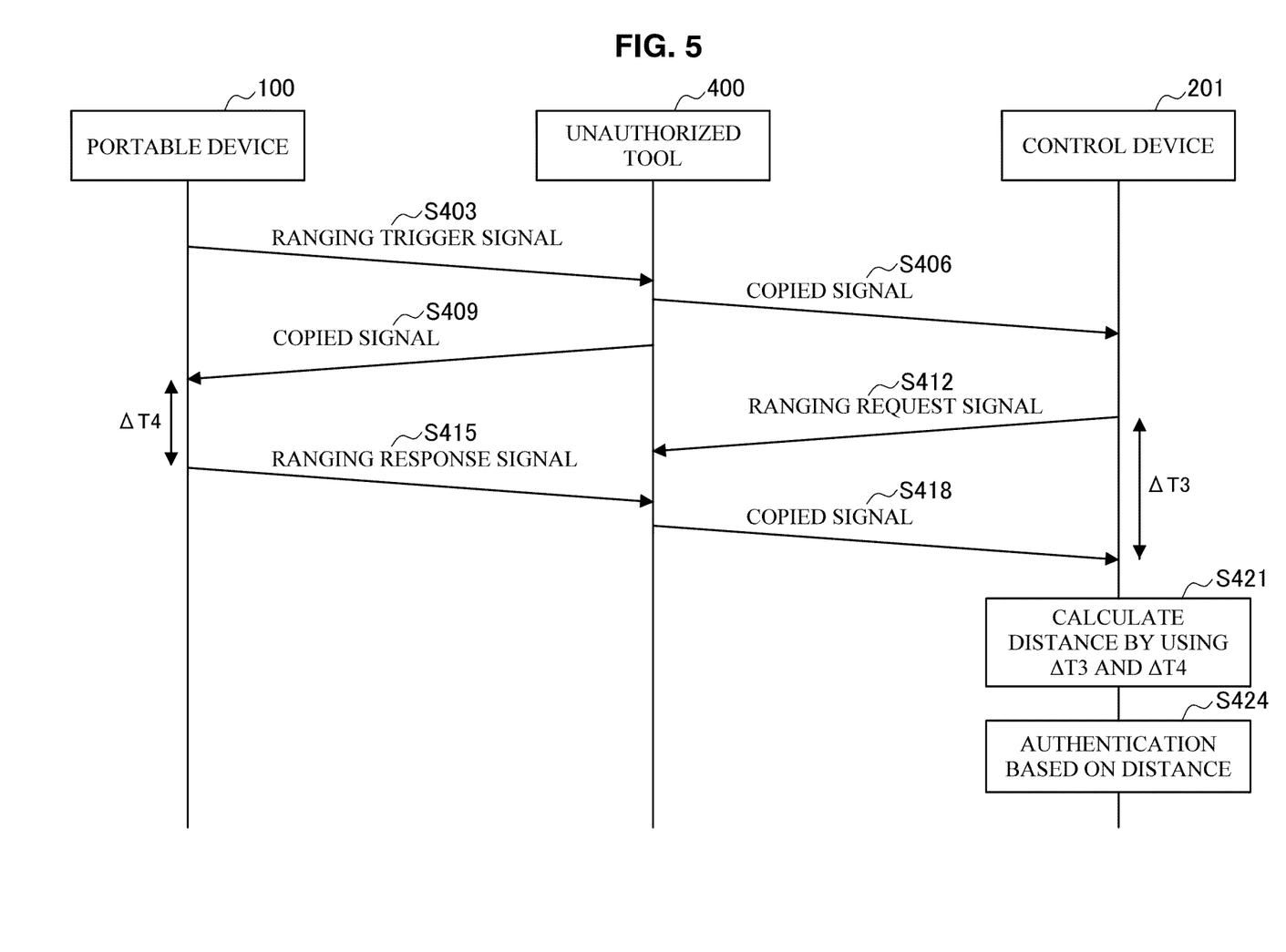
FIG. 5 is a diagram for describing misidentification of a signal observed when an unauthorized tool is used.

FIG. 5 is a diagram for describing misidentification of a signal observed when an unauthorized tool is used. As illustrated in FIG. 5, the portable device 100 first transmits a ranging trigger signal (Step S403). For example, the ranging trigger signal may be the UWB signal.

Next, an unauthorized tool 400 copies the ranging trigger signal received from the portable device 100, and transmits a copied signal to the control device 201 according to the comparative example (Step S406). In addition, the unauthorized tool 400 also transmits the copied signal to the portable device 100 (Step S409). When the unauthorized tool 400 copies the ranging trigger signal, encrypted information included in the signal is also copied without any change.

Next, the control device 201 misidentifies the signal as a legitimate ranging trigger signal on the basis of the authentication information included in the signal copied by the unauthorized tool 400, and transmits a ranging request signal (Step S412). For example, the signal copied by the unauthorized tool 400 is a UWB signal, and is received by one of wireless communication sections of the control device 201.

On the other hand, when authentication based on the authentication information included in the signal copied by the unauthorized tool 400 succeeds, the portable device 100 misidentifies the signal as a legitimate ranging request signal, and transmits a ranging response signal after designated time (ΔT4) elapses (Step S415). For example, in the case where the ranging signals using the UWB include same authentication information, the portable device 100 transmits the ranging trigger signal and authentication succeeds on the basis of authentication information included in the ranging signal using the UWB, which is received while the portable device 100 is in the reception waiting state. Therefore, although the received signal is actually an unauthorized reply signal that has been obtained by copying the ranging trigger signal, there is a possibility that the portable device 100 may misidentify the unauthorized reply signal as a ranging request signal from the control device 201.

Next, an unauthorized tool 400 copies a ranging response signal transmitted from the portable device 100, and transmits a copied signal to the control device 201 (Step S418). When the unauthorized tool 400 copies the ranging response signal, encrypted information included in the signal is also copied without any change.

Next, the control device 201 misidentifies the signal as a legitimate ranging response signal on the basis of the authentication information included in the signal copied by the unauthorized tool 400, and calculates a distance between the portable device 100 and the control device 201 (Step S421). Specifically, the control device 201 measures a time period $\Delta T3$ from transmission time of the ranging request signal serving as the first ranging signal to reception time of the ranging response signal serving as the second ranging signal, and calculates the distance on the basis of the measured time period $\Delta T3$ and the known time period $\Delta T4$.

Next, the control device 201 authenticates the portable device 100 on the basis of whether or not the calculated distance satisfies a predetermined condition (Step S424). For example, the control device 201 determines that the authentication succeeds if the calculated distance is a predetermined value or less. If not, the control device 201 determines that the authentication ends in failure. Here, actually, the portable device 100 is far from the control device 201. In other words, round-trip time it takes to transmit and receive signals is longer than $\Delta T3$. However, the unauthorized tool 400 fakes the time period $\Delta T3$ in such a manner that the time period $\Delta T3$ becomes shorter than the actual time. Accordingly, the fake distance to the portable device 100 is obtained, and authentication between the control device 201 and the portable device 100 succeeds improperly.

On the other hand, when using the system 1 according to the present invention, it is possible to reduce the possibility of the improper authentication process. The portable device 100 and the control device 200 included in the system 1 according to the present invention use different pieces of authentication information, which are included in the ranging signals, depending on the signal types. Next, details thereof will be described with reference to FIG. 6.

Figure 6:
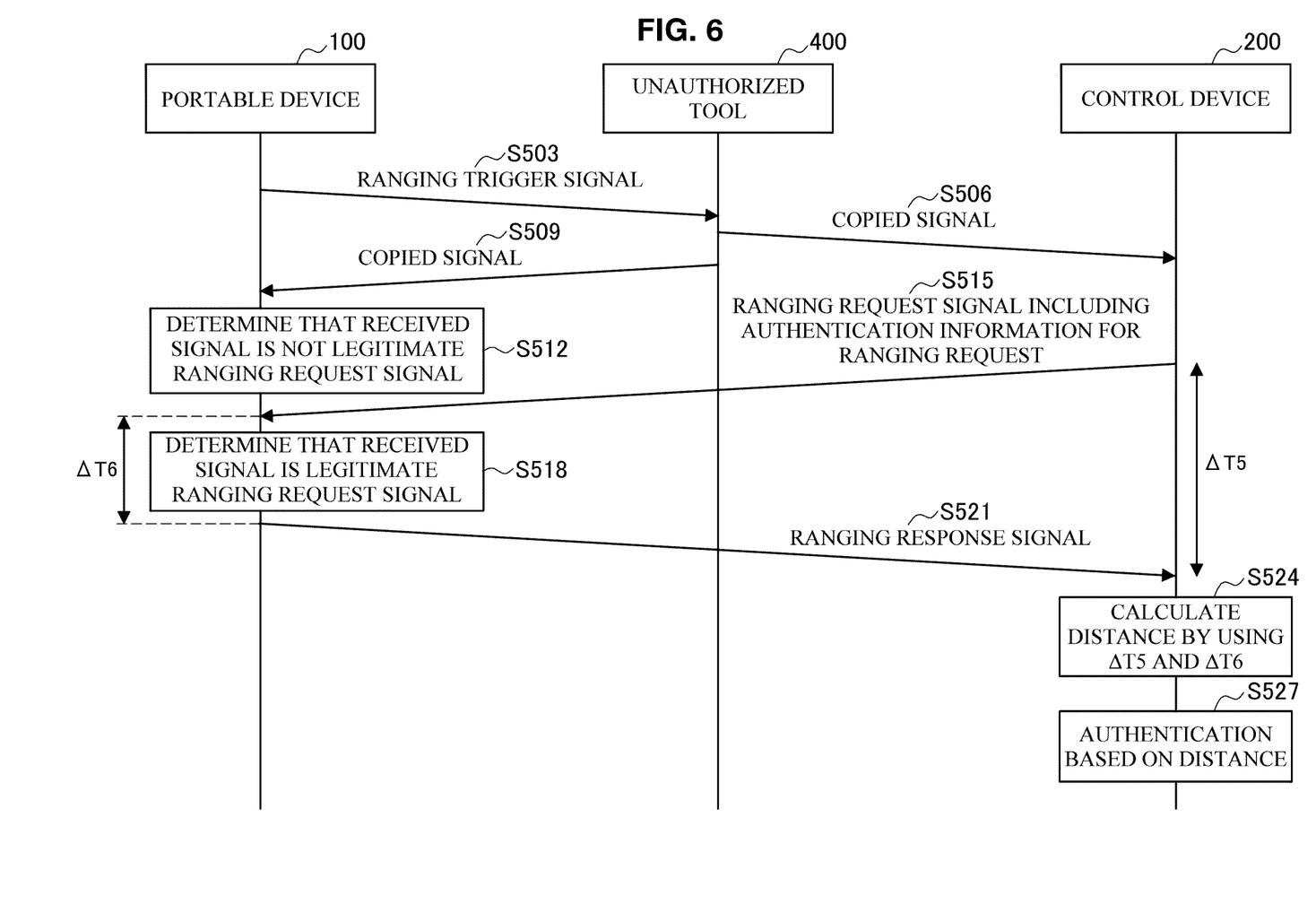
FIG. 6 is a sequence diagram illustrating an example of an authentication process based on a distance according to an application example of the embodiment.

FIG. 6 is a sequence diagram illustrating an example of an authentication process based on a distance according to an application example of the above-described embodiment. As illustrated in FIG. 6, the portable device 100 first transmits a ranging trigger signal (Step S503). The portable device 100 transmits the ranging trigger signal including authentication for the ranging trigger signal. For example, the portable device 100 transmits the ranging trigger signal including information, which is obtained by encrypting designated information with a common key for the ranging trigger signal, as the authentication information.

Next, the unauthorized tool 400 copies the ranging trigger signal received from the portable device 100, and transmits a copied signal to the control device 200 (Step S506). In addition, the unauthorized tool 400 also transmits the copied signal to the portable device 100 (Step S509). When the unauthorized tool 400 copies the ranging trigger signal, encrypted information included in the signal is also copied without any change.

Next, the control device 200 misidentifies the signal as a legitimate ranging trigger signal on the basis of the authentication information included in the signal copied by the unauthorized tool 400, and transmits a ranging request signal (Step S515). In the case where the unauthorized tool 400 copies the signal, the authentication information for the ranging trigger signal is also copied without any change. Therefore, at this time, there is a possibility that the control device 200 may misidentify the portable device 100. The control device 200 transmits the signal including authentication information for the ranging request signal. For example, the control device 200 transmits the ranging request signal including information, which is obtained by encrypting designated information with a common key for the ranging request signal, as the authentication information.

On the other hand, the signal that is copied by the unauthorized tool 400 and transmitted to the portable device 100 includes the copied authentication information, which has been included in the ranging trigger signal. This results in authentication failure. Accordingly, it is possible for the portable device 100 to determine that the received signal is not the legitimate ranging request signal (Step S512). This makes it possible to avoid transmission of a ranging response signal based on the copied signal as illustrated in Step S415 of FIG. 5, and this results in reduction in probability of fake distance.

Next, the ranging request signal that is misidentified and transmitted by the control device 200 includes authentication information for the ranging request signal. This results in successful authentication. Accordingly, it is possible for the portable device 100 to determine that the received signal is the legitimate ranging request signal (Step S518).

Next, the portable device 100 transmits a ranging response signal (Step S521) when a designated time period ($\Delta T6$) elapses. The portable device 100 transmits the ranging response signal including authentication for the ranging response signal. For example, the portable device 100 transmits the ranging response signal including information, which is obtained by encrypting designated information with a common key for the ranging response signal, as the authentication information.

Next, the control device 200 determines that the ranging response signal is a legitimate ranging response signal on the basis of the authentication information included in the ranging response signal transmitted from the portable device 100, and calculates a distance between the portable device 100 and the control device 200 (Step S524). Specifically, the control device 200 measures a time period $\Delta T5$ from transmission time of the ranging request signal serving as the first ranging signal to reception time of the ranging response signal serving as the second ranging signal, and calculates the distance on the basis of the measured time period $\Delta T5$ and the known time period $\Delta T6$. The time period $\Delta T5$ is actual round-trip time taken to transmit and receive the signals. Unlike the comparative example illustrated in FIG. 5, there is no fabrication. It is possible for the control device 200 to calculate a correct distance.

Next, the control device 200 authenticates the portable device 100 on the basis of whether or not the calculated distance satisfies a predetermined condition (Step S424). For example, the control device 200 determines that the authentication succeeds if the calculated distance is a predetermined value or less. If not, the control device 200 determines that the authentication ends in failure. In this example, the distance to the portable device 100 is long, and it is determined that the authentication ends in failure. As described above, even if the unauthorized tool 400 is used, it is possible to reduce a possibility of fake distance between the portable device 100 and the control device 200 and it is possible to reduce a possibility of improper authentication between the control device 200 and the portable device 100, without the misidentification of signal.

6 Conclusion

Although details of the preferable embodiments of the present invention have been described above with reference to the appended drawings, the present invention is not limited thereto. It will be clear to a person of ordinary skill in the art of the present invention that various modifications and improvements may be obtained within the scope of the technical idea recited by the scope of the appended claims, and it should be understood that they will naturally come under the technical scope of the present invention.

For example, although the example in which the authenticator transmits the first ranging signal has been described in the above embodiment, the present invention is not limited thereto. The authenticator is the control device 200 of the vehicle 20, for example. For example, it is also possible for the authenticatee to transmit the first ranging signal. The authenticatee is the portable device 100, for example. When the first ranging signal is received from the portable device 100, the control device 200 transmits the second ranging signal in response to the first ranging signal. When the second ranging signal is received, the portable device 100 measures a time period $\Delta T1$ that is a time period from transmission time of the first ranging signal to reception time of the second ranging signal. Next, the portable device 100 transmits data signal including information obtained by encrypting information indicating the measured time period $\Delta T1$. On the other hand, the control device 200 measures a time period $\Delta T2$ from reception time of the first ranging signal to transmission time of the second ranging signal. Next, when the data signal is received from the portable device 100, the control device 200 calculates the distance between the portable device 100 and the control device 200 on the basis of the measured time period $\Delta T2$ and the time period $\Delta T1$ indicated by the data signal received from the portable device 100. For example, time taken to transmit or receive a one-way signal is calculated by subtracting $\Delta T2$ from $\Delta T1$ and dividing the subtracted value by 2, and then a distance between the portable device and the control device is calculated by multiplying the calculated time by speed of the signal. As described above, in the case where the directions of transmitting and receiving the first ranging signal and the second ranging signal are reversed, the control device 200 performs control in such a manner that the control device 200 transitions to the waiting state of waiting for the first ranging signal transmitted from the portable device 100. The control device 210 may transition to the waiting state of waiting for the first ranging signal at any timing.

In addition, although the example in which the portable device 100 serves as the authenticatee and the control device 200 of the vehicle 20 serves as the authenticator has been described in the above embodiment, the present invention is not limited thereto. The roles of the portable device 100 and the control device 200 of the vehicle 20 may be reversed, or the roles may be switched dynamically. In addition, the ranging and authentication may be performed between the control devices 200 of the vehicles 20.

In addition, although the example in which the portable device 100 serves as an example of the communication device and the control device 200 serves as an example of the control device has been described in the above embodiment, the present invention is not limited thereto. The portable device 100 may serves as an example of the control device, and the control device 200 may serve as an example of the communication device.

In addition, for example, although the example in which the present invention is applied to the smart entry system has been described in the above embodiment, the present invention is not limited thereto. The present invention is applicable to any system that performs the ranging and authentication by transmitting/receiving signals. Examples of the target to be used by the user includes a drone, a vehicle, a ship, an airplane, a building, a robot, a locker, and a home appliance, and the like. Examples of the building include a house and the like. In addition, the present invention is applicable to a pair of any two devices selected from a group including portable devices, vehicles, ships, airplanes, smartphones, drones, buildings, robots, lockers, home appliances, and the like. Note that, the pair may include two device of a same type, or may include two devices of different types. In this case, one of the devices operates as a first communication device and the other device operates as a second communication device.

In addition, for example, in the above embodiment, the standard using the UWB has been exemplified as the wireless communication standard. However, the present invention is not limited thereto. For example, it is also possible to use a standard using infrared as the wireless communication standard.

In addition, for example, although the above embodiment has been described on the assumption that the control section 240 is configured as the ECU and controls overall operation of the control system 200, the present invention is not limited thereto. For example, each of the first wireless communication section 210 and the second wireless communication section 220 may include an ECU. In this case, the first wireless communication section 210 and the second wireless communication section 220 may also be referred to as the mobile-object-mounted communication device. In a way similar to the control device 200 described above, the mobile-object-mounted communication device may execute a process based on authentication information included in a received signal, or a process of controlling transition to the reception waiting state.

Note that, the series of processes performed by the devices described in this specification may be achieved by any of software, hardware, and a combination of software and hardware. A program that configures the software is stored in advance in, for example, a recording medium (non-transitory medium) installed inside or outside the devices. In addition, for example, when a computer executes the programs, the programs are read into RAM, and executed by a processor such as a CPU. The recording medium may be a magnetic disk, an optical disc, a magneto-optical disc, flash memory, or the like, for example. Alternatively, the above-described computer program may be distributed via a network without using the recording medium, for example.

Further, in this specification, the processes described using the sequence diagrams and flowcharts are not necessarily executed in the order illustrated in the drawings. Some processing steps may be executed in parallel. In addition, additional processing steps may be employed and some processing steps may be omitted.

What is claimed is:
1. A control device comprising:
 a controller configured to control an authentication process of performing a process related to device authentication together with at least one communication device on a basis of information included in a signal received through wireless communication with the communication device, wherein the controller performs control in such a manner that a signal including authentication information that is information to be used for the authentication process is transmitted to the communication device through the wireless communication, the authentication information varying depending on signal types, which are types of roles of signals to be transmitted to the communication device in the authentication process; and wherein the signal types include two types of signals among a trigger signal having a role in notifying of start of the authentication process, a request signal having a role in being returned and requesting a response in a case where the trigger signal is received, and a response signal having a role in being returned and responding to the request in the case where the request signal is received.

2. The control device according to claim 1,
wherein the authentication information is encrypted information.

3. The control device according to claim 2,
wherein the encrypted information is information generated by using an encryption key that is common to the communication device.

4. The control device according to claim 3,
wherein the encrypted information is information generated by using an encryption key that is common to the communication device with regard to each of the signal types.

5. The control device according to claim 1,
wherein the authentication information is preset identification information.

6. The control device according to claim 1, wherein
in the authentication process, the controller performs ranging authentication of measuring a distance between the communication device and the control device,
the trigger signal is a ranging trigger signal that notifies of start of the ranging authentication,
the request signal is a ranging request signal that requests a response to calculate the distance, and
the response signal is a ranging response signal that makes a response in a case where the ranging request signal is received.

7. The control device according to claim 1,
wherein at least authentication information included in the trigger signal is different from authentication information included in the request signal and the response signal.

8. The control device according to claim 1, wherein
the control device is installed in a mobile object, and
the communication device is carried by a user of the mobile object.

9. The control device according to claim 8, comprising:
one or more communication sections configured to perform wireless communication with the communication device; and
the controller.

10. The control device according to claim 8,
wherein the control device
controls one or more mobile-object-mounted communication devices, each of which is installed in the mobile object and performs wireless communication with the communication device, and
controls transmission/reception of a signal to/from the communication device via the one or more mobile-object-mounted communication devices.

11. The control device according to claim 1, wherein
the communication device is installed in a mobile object, and
the control device is carried by a user of the mobile object.

12. The control device according to claim 11, wherein
the communication device includes
a plurality of communication sections configured to perform wireless communication with the control device, and
the controller, and
the control device generates the authentication information by using an encryption key that varies depending on the signal types and the plurality of communication sections.

13. A control method comprising, by a processor:
controlling an authentication process of performing a process related to device authentication together with at least one communication device on a basis of information included in a signal received through wireless communication with the communication device,
wherein the control is performed in such a manner that a signal including authentication information that is information to be used for the authentication process is transmitted to the communication device through the wireless communication, the authentication information varying depending on signal types, which are types of roles of signals to be transmitted to the communication device in the authentication process; and
wherein the signal types include two types of signals among a trigger signal having a role in notifying of start of the authentication process, a request signal having a role in being returned and requesting a response in a case where the trigger signal is received, and a response signal having a role in being returned and responding to the request in the case where the request signal is received.

* * * * *